United States Patent
Tasher et al.

(10) Patent No.: US 9,455,962 B2
(45) Date of Patent: Sep. 27, 2016

(54) PROTECTING MEMORY INTERFACE

(71) Applicant: Winbond Electronics Corporation, Zhubei (TW)

(72) Inventors: Nir Tasher, Tel Mond (IL); Moshe Alon, Tel Aviv (IL); Valery Teper, Petah Tikva (IL); Ziv Hershman, Giv'at Shmu'el (IL); Uri Kaluzhny, Beit Shemesh (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 81 days.

(21) Appl. No.: 14/301,456

(22) Filed: Jun. 11, 2014

(65) Prior Publication Data
US 2015/0089223 A1 Mar. 26, 2015

Related U.S. Application Data

(60) Provisional application No. 61/880,932, filed on Sep. 22, 2013.

(51) Int. Cl.
| H04L 9/32 | (2006.01) |
| H04L 29/06 | (2006.01) |
| G06F 21/85 | (2013.01) |
| H04L 9/06 | (2006.01) |

(52) U.S. Cl.
CPC ........... *H04L 63/0428* (2013.01); *G06F 21/85* (2013.01); *H04L 9/0662* (2013.01); *H04L 9/3247* (2013.01)

(58) Field of Classification Search
CPC ...................................................... H04L 63/08

USPC ........................................................ 713/168
See application file for complete search history.

(56) References Cited

U.S. PATENT DOCUMENTS

| 4,521,853 A | 6/1985 | Guttag |
| 5,671,283 A | 9/1997 | Michener et al. |
| 6,272,637 B1 | 8/2001 | Little et al. |
| 6,915,175 B2 | 7/2005 | Ahn |
| 6,976,136 B2 | 12/2005 | Falik et al. |
| 7,082,539 B1 | 7/2006 | Kitahara et al. |
| 7,194,626 B2 | 3/2007 | Craft |
| 7,248,696 B2 | 7/2007 | Craft et al. |

(Continued)

FOREIGN PATENT DOCUMENTS

| AU | 2001027074 B2 | 7/2001 |
| EP | 1063811 A1 | 12/2000 |

(Continued)

OTHER PUBLICATIONS

TCG PC Specific Implementation Specification, Version 1.1, 72 pages, Aug. 18, 2003.

(Continued)

*Primary Examiner* — Christopher Brown
(74) *Attorney, Agent, or Firm* — D.Kligler IP Services Ltd.

(57) ABSTRACT

An apparatus includes an interface and logic circuitry. The interface is configured to communicate over a communication link. The logic circuitry is configured to convert between a first stream of plaintext bits and a second stream of ciphered bits that are exchanged over the communication link, by applying a cascade of a stream ciphering operation and a mixing operation that cryptographically maps input bits to output bits.

14 Claims, 4 Drawing Sheets

(56) References Cited

U.S. PATENT DOCUMENTS

| | | |
|---|---|---|
| 7,269,747 B2 | 9/2007 | Catherman et al. |
| 7,739,565 B1 | 6/2010 | Lesea |
| 7,826,271 B2 | 11/2010 | Cernea |
| 7,836,269 B2 | 11/2010 | Obereiner et al. |
| 7,881,094 B2 | 2/2011 | Chen |
| 7,882,365 B2 | 2/2011 | Natarajan et al. |
| 7,889,592 B2 | 2/2011 | Kim |
| 8,041,032 B2 | 10/2011 | Katoozi et al. |
| 8,108,941 B2 | 1/2012 | Kanai |
| 8,140,824 B2 | 3/2012 | Craft |
| 8,225,182 B2 | 7/2012 | Kagan et al. |
| 8,312,294 B2 | 11/2012 | Sato et al. |
| 8,427,194 B2 | 4/2013 | Deas et al. |
| 8,429,513 B2 | 4/2013 | Smith et al. |
| 8,549,246 B2 | 10/2013 | Pekny et al. |
| 8,576,622 B2 | 11/2013 | Yoon et al. |
| 8,578,179 B2 | 11/2013 | Accicmez et al. |
| 8,745,408 B2 | 6/2014 | Mangard |
| 8,756,439 B1 | 6/2014 | Jannson et al. |
| 8,781,111 B2 | 7/2014 | Qi et al. |
| 8,832,455 B1 | 9/2014 | Drewry et al. |
| 2001/0003540 A1 | 6/2001 | Pomet et al. |
| 2002/0164022 A1 | 11/2002 | Strasser et al. |
| 2003/0005453 A1* | 1/2003 | Rodriguez ......... H04N 7/17318 725/87 |
| 2003/0084285 A1 | 5/2003 | Cromer et al. |
| 2003/0084346 A1 | 5/2003 | Kozuch et al. |
| 2003/0097579 A1 | 5/2003 | England et al. |
| 2003/0200026 A1 | 10/2003 | Pearson |
| 2004/0260932 A1 | 12/2004 | Blangy et al. |
| 2005/0024922 A1 | 2/2005 | Li et al. |
| 2005/0039035 A1 | 2/2005 | Clowes |
| 2005/0058285 A1* | 3/2005 | Stein ..................... H04L 9/0631 380/29 |
| 2005/0114687 A1 | 5/2005 | Zimmer et al. |
| 2005/0123135 A1 | 6/2005 | Hunt et al. |
| 2006/0026418 A1 | 2/2006 | Bade et al. |
| 2006/0026693 A1 | 2/2006 | Bade et al. |
| 2006/0059553 A1 | 3/2006 | Morais et al. |
| 2006/0107054 A1 | 5/2006 | Young |
| 2006/0253708 A1 | 11/2006 | Bardouillet et al. |
| 2007/0133437 A1 | 6/2007 | Wengrovitz et al. |
| 2007/0192592 A1 | 8/2007 | Goettfert et al. |
| 2008/0155273 A1 | 6/2008 | Conti |
| 2009/0196420 A1 | 8/2009 | Chester et al. |
| 2009/0217377 A1 | 8/2009 | Arbaugh et al. |
| 2009/0327633 A1 | 12/2009 | Fusella et al. |
| 2010/0070779 A1 | 3/2010 | Martinez et al. |
| 2010/0098247 A1 | 4/2010 | Suumaki |
| 2010/0106920 A1 | 4/2010 | Anckaert et al. |
| 2010/0146190 A1 | 6/2010 | Chang |
| 2010/0158242 A1 | 6/2010 | Asher |
| 2010/0169654 A1 | 7/2010 | Kiel et al. |
| 2011/0185435 A1 | 7/2011 | Chang |
| 2011/0283115 A1 | 11/2011 | Junod |
| 2011/0285421 A1 | 11/2011 | Deas et al. |
| 2012/0102307 A1 | 4/2012 | Wong |
| 2012/0204056 A1 | 8/2012 | Airaud et al. |
| 2012/0275595 A1 | 11/2012 | Emelko |
| 2013/0145177 A1 | 6/2013 | Cordella et al. |
| 2013/0262880 A1 | 10/2013 | Pong et al. |
| 2013/0339730 A1 | 12/2013 | Nagai et al. |
| 2013/0339744 A1 | 12/2013 | Nagai et al. |
| 2014/0082721 A1 | 3/2014 | Hershman et al. |
| 2014/0143883 A1 | 5/2014 | Shen-Orr et al. |
| 2014/0281564 A1 | 9/2014 | Nagai et al. |
| 2015/0074406 A1 | 3/2015 | Nagai et al. |

FOREIGN PATENT DOCUMENTS

| | | |
|---|---|---|
| EP | 1615370 A1 | 1/2006 |
| EP | 2566096 A2 | 3/2013 |
| WO | 03053001 A1 | 6/2003 |
| WO | 2013035006 A1 | 3/2013 |

OTHER PUBLICATIONS

TCG PC Client Specific Implementation Specification for Conventional BIOS, Version 1.20 Final Revision 1.00, 1.2; Level 2, 119 pages, Jul. 13, 2005.
TCG PC Client Specific TPM Interface Specification (TIS), Specification Version 1.21 Revision 1.00, 103 pages, Apr. 28, 2011.
TPM Main Part 1 Design Principles, Specification Version 1.2 ,Revision 62, 150 pages, Oct. 2, 2003.
Java Security Architecture, 62 pages, Dec. 6, 1998.
Tasher et al., U.S. Appl. No. 14/244,000, filed Apr. 3, 2014.
Tasher et al., U.S. Appl. No. 14/467,077, filed Aug. 25, 2014.
Kaluzhny et al., U.S. Appl. No. 14/311,396, filed Jun. 23, 2014.
Japanese Application # 2014-192887 Office Action dated Aug. 18, 2015.
European Application # 14185186.5 Search Report dated Feb. 17, 2015.
U.S. Appl. No. 14/467,077 Office Action dated Sep. 30, 2015.
U.S. Appl. No. 14/311,396 Office Action dated Sep. 8, 2015.
U.S. Appl. No. 15/004,957 Office Action dated Feb. 24, 2016.
KR Application # 10-2014-0125216 Office Action dated Feb. 16, 2016.
U.S. Appl. No. 13/965,256, Office Action dated Jun. 27, 2016.
U.S. Appl. No. 14/702,791, Office Action dated Jun. 16, 2016.
Zhuang, H.,"HIDE: An Infrastructure for Efficiently Protecting Information Leakage on the Address Bus", Proceedings of the 11th international conference on Architectural support for programming languages and operating systems (ASPLOS'04), pp. 72-84, Boston, USA, Oct. 9-13, 2004.

* cited by examiner

PROTECTING MEMORY INTERFACE

CROSS-REFERENCE TO RELATED APPLICATIONS

This application claims the benefit of U.S. Provisional Patent Application 61/880,932, filed Sep. 22, 2013, whose disclosure is incorporated herein by reference.

FIELD OF THE INVENTION

The present invention relates generally to data security, and particularly to methods and systems for protecting stream-ciphered data.

BACKGROUND OF THE INVENTION

In various secure storage systems a host exchanges data with one or more storage devices. Methods for securing the interface between the host and the storage devices are known in the art. For example, U.S. Patent Application Publication 2013/0262880, whose disclosure is incorporated herein by reference, describes a memory access circuit and a corresponding method. The memory access circuit includes a cryptographic block in communication with a memory that encrypts data of a data block on a block basis. The memory access circuit also includes a fault injection block configured to inject faults to the data in the data block. The memory access circuit further includes a data scrambler and an address scrambler. The data scrambler is configured to scramble data in the memory by shuffling data bits within the data block in a plurality of rounds and mash the shuffled data bits with random data. The address scrambler is configured to distribute the scrambled data across the memory. A memory system including the memory access circuit is also disclosed to implement the corresponding method.

As another example, U.S. Patent Application Publication 2011/0283115, whose disclosure is incorporated herein by reference, describes a method for generating final software code, which is resistant to reverse engineering analysis, from an initial software code, which is executed by a processor that directly handles data of maximal size of M bits. Generating the final software code comprises the steps of: (i) building a conversion table whose input comprises one instruction and its output comprises a plurality of equivalent instructions or sets of instructions, (ii) splitting the input data into a plurality of segments, each segment having a random length not exceeding M, and (iii) for each instruction of a block of instructions, selecting pseudo-randomly an equivalent instruction or set of instructions using the conversion table so as to obtain an equivalent block of instructions, and appending the plurality of equivalent blocks of instructions to obtain the final software code.

SUMMARY OF THE INVENTION

An embodiment of the present invention that is disclosed herein provides an apparatus including an interface and logic circuitry. The interface is configured to communicate over a communication link. The logic circuitry is configured to convert between a first stream of plaintext bits and a second stream of ciphered bits that are exchanged over the communication link, by applying a cascade of a stream ciphering operation and a mixing operation that cryptographically maps input bits to output bits.

In some embodiments, the ciphered bits are exchanged over the communication link between a memory device and a processor. In other embodiments, the ciphered bits exchanged over the communication link comprise software code that executes in real time on the processor.

In an embodiment, the logic circuitry includes two or more interconnected mixing stages, including at least first and last mixing stages, each mixing stage including multiple Galois Field (GF) multipliers, and the logic circuitry is configured to apply the mixing operation by splitting the input bits among the GF multipliers of the first mixing stage, and combining results of the last mixing stage to produce the output bits. In another embodiment, each of the GF multipliers in the one or more mixing stages is configured to accept multiplicand bits from the input bits or from a previous mixing stage, and to further accept a respective mixing key, wherein the mixing key is the GF multiplicative inverse of a corresponding mixing key in a remote apparatus at an opposite side of the communication link, and the logic circuitry is configured to apply the mixing operation by multiplying the multiplicand bits by the respective mixing key in each of the multiple GF multipliers.

In some embodiments, the logic circuitry is configured to apply the mixing operation by multiplying the input bits by a respective non constant mixing key in a Galois-Field (GF). In other embodiments, the logic circuitry is configured to iteratively update the mixing key in coordination with a remote apparatus at an opposite side of the communication link, by multiplying the mixing key in the respective GF by a constant element or by a GF multiplicative inverse of the constant element, such that at any given time the mixing key is the GF multiplicative inverse of a corresponding mixing key used by the remote apparatus. In yet other embodiments, the constant element and the GF multiplicative inverse equal 2 and $2^{-1}$ respectively, and the logic circuitry is configured to generate the mixing key using a Linear Feedback Shift Register (LFSR) that implements a GF multiplication operation using a shifting operation. In yet further other embodiments, the logic circuitry is configured to initialize the mixing key to a number that is an integer power of 2 or $2^{-1}$ in the respective GF so that an initial mixing key is the GF multiplicative inverse of a corresponding initial mixing key used by the remote apparatus.

There is additionally provided, in accordance with an embodiment of the present invention, a method, including exchanging ciphered bits over a communication link. A conversion between a first stream of plaintext bits and a second stream of the ciphered bits that are exchanged over the communication link is carried out, by applying a cascade of a stream ciphering operation and a mixing operation that cryptographically maps input bits to output bits.

The present invention will be more fully understood from the following detailed description of the embodiments thereof, taken together with the drawings in which:

DETAILED DESCRIPTION OF EMBODIMENTS

Overview

Figure 1:
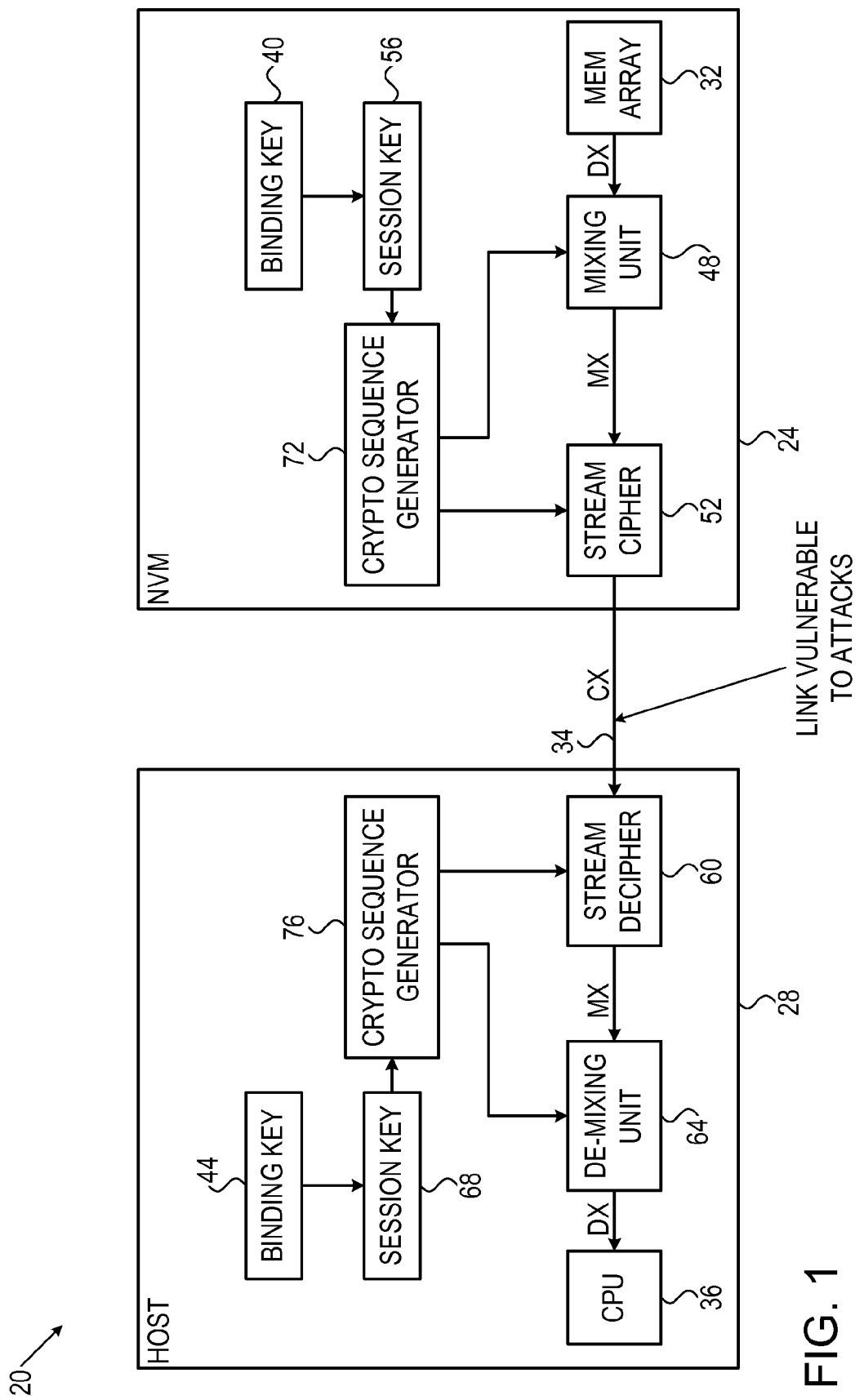
FIG. 1 is a block diagram that schematically illustrates a secure storage system, in accordance with an embodiment of the present invention.

In many secure storage systems, a host communicates with a memory device over a communication link or bus that may be vulnerable to various cryptographic attacks. Embodiments of the present invention that are described herein provide improved methods and systems for securing the interface of a memory device against cryptographic attacks.

The link between the host and the memory device can be secured, in principle, by encrypting the data exchanged over the link, in both directions. In the reading direction the memory device sends ciphered data to the host, and in the writing direction the memory device receives ciphered data from the host. In each communication direction, one of the memory device and host serves as a sending party, and the other as a receiving party.

Low latency in accessing the memory is important, for example, when the Central Processing Unit (CPU) of the host executes code that is fetched in real-time from the memory device. To reduce latency and complexity, the data communicated over the link is typically encrypted using stream ciphering techniques, as opposed to high-latency block ciphering. At the sending party, a stream cipher encrypts plaintext data with a pseudo-random sequence (e.g., using a bitwise XOR operation) to produce the cipher text, and at the receiving party, a decipher decrypts the cipher text with the same sequence to recover the plaintext data.

Stream ciphering is advantageous in terms of low complexity and latency, but may be vulnerable to cryptographic attacks, such as attacks that are based on bit positions. For example, an unauthorized attacker may monitor or change the value of the stream-ciphered data in accordance with a certain periodic pattern corresponding to one or more fix-positioned bits of the memory device interface, in an attempt to break the security of the system. Embodiments that are described herein protect against this vulnerability of the stream-cipher.

In the reading direction, the memory device serves as a sending end, and the host as a receiving end. In some embodiments, prior to masking by the stream cipher, the memory device applies a cryptographic mixing operation to the plaintext using a secret mapping key. The mixing operation maps the plaintext data bits into mixed bits, such that it would be infeasible for an unauthorized user, who does not know the mapping key, to guess the values and/or positions of the plaintext data bits. The host, after de-ciphering, applies an inverse mapping (with respect to the mixing mapping) to de-mix the mixed bits and recover the plaintext data. In the writing direction, the host and memory device respectively serve as sending and receiving ends, applying a similar processing flow.

In an embodiment, cryptographic mixing is based on Galois-Field (GF) arithmetic. In the description that follows, we assume that arithmetic operations are applied to the elements of a given Galois Field (GF) that may be generated using some underlying generating polynomial. Since the disclosed techniques apply to any valid generating polynomial, the details regarding the underlying generating polynomial are typically omitted. The term "multiplication" thus refers to multiplication between elements in the given GF, and the term "multiplicative inverse" of a given element refers to an element in the GF that, when multiplied by the given element (using GF arithmetic), results in the unity element defined in that GF. Similarly the term "power" refers to repeated multiplications of an element in the given GF by itself.

Assume, for example, a mixing unit at the sending end, which receives N-bit plaintext data DX. In an example embodiment N=32 bits, but in alternative embodiments N may comprise any suitable positive integer. The mixing unit comprises an N-bit GF multiplier that multiplies DX by an N-bit secret mapping key K, and outputs an N-bit mixed data MX=K*DX, wherein the operator * denotes multiplication in the respective GF.

The receiving end comprises a de-mixing unit that accepts the N-bit MX, and using a similar N-bit GF multiplier, multiplies MX by an inverse mapping key that equals the multiplicative inverse of the mapping key K, i.e., DX=MX*$K^{-1}$.

In some embodiments, each of the sending and receiving parties iteratively updates the mixing key in coordination with the other party at the opposite side of the communication link, such that at any given time the mixing key used by one party is the GF multiplicative inverse of the corresponding mixing key used by the other party.

In some embodiments, the mixing unit generates the secret mapping key K using a Linear Feedback Shift Register (LFSR), and the de-mixing unit generates the inverse mapping key $K^{-1}$ using another LFSR. The LFSRs used for mixing and de-mixing are initialized to respective secret values R and $R^{-1}$, and are shifted in synchronization with one another so that the respective mapping keys (in the sending end and in the receiving end) equal the multiplicative inverse of one another.

Calculating the GF multiplicative inverse of an arbitrary element in the GF involves considerable computational resources. In an embodiment, to reduce the complexity of calculating the initial inverse value $R^{-1}$ at the de-mixing unit, the initial value R is restricted to be a non-negative integer power r of 2, i.e., $R=2^r$. The de-mixing unit holds a fixed pre-calculated value of $2^{-1}$, and calculates the initial inverse value as a power r of $2^{-1}$, i.e., $R^{-1}=(2^{-1})^r$. The complexity of calculating $R^{-1}$ via power operations is significantly lower compared to general multiplicative inverse calculations.

Generating the mixing keys using LFSRs is not mandatory. In alternative embodiments, any other suitable means can be used for initializing and updating the mixing keys in the sending and receiving ends to be the GF multiplicative inverse of one another at any given time. Additionally or alternatively, the mixing keys can be configured to be an integer power of a constant number in the respective GF other than 2 and $2^{-1}$.

In some embodiments, the mixing unit mixes 32-bit plaintext data by applying two mixing stages, each comprising four 8-bit GF multipliers. In the first stage, each of the four GF multipliers multiplies an 8-bit input data drawn from the 32-bit plaintext data, by a respective 8-bit mapping key. Using 8-bit multipliers (rather than a 32-bit multiplier) is advantageous in terms of physical size, implementation complexity and latency.

An interconnection scheme maps the 32 bits output from the first stage into four 8-bit that input the four GF multipliers of the second stage. Each of the GF multipliers of the second stage multiplies its respective 8-bit input by a respective 8-bit mapping key to produce an 8-bit mixed output. The four 8-bit outputs of the second stage are then combined to produce a 32-bit mixed data output.

In some embodiments, the mixing unit generates the eight mapping keys for the first and second mixing stages using a 64-bit LFSR. The mixing unit splits the 64-bit LFSR output into two 32-bit keys that are each further split into four 8-bit mapping keys.

In the receiving end, a de-mixing unit comprises two de-mixing stages that each comprises four 8-bit GF multipliers. The de-mixing unit further comprises a 64-bit LFSR operating in synchronization with the LFSR of the mixing unit, and that outputs eight 8-bit inverse mapping keys, each equals the multiplicative inverse of a respective mapping key of the mixing unit. In an embodiment, the LFSRs in both sides generate the same pseudo-random sequence, and at the de-mixing side each 8-bit subgroup of the 32-bit LFSR output is separately inverted in the respective GF, e.g., using a lookup table. The tables size and memory space required for inverting four 8-bit GF elements (1K×8 bit) is significantly smaller than a lookup table required for inverting a 32-bit GF element (4G×32 bit).

The de-mixing unit applies the GF multiplications in the two de-mixing stages, and further applies an inverse interconnection scheme between the first and second de-mixing stages, so as to recover the plaintext data.

In the disclosed techniques, cryptographic mixing is performed prior to stream ciphering. The mixing operation maps plaintext data bits into mixed bits that disguise the true values and positions of the plaintext bits. Implementing the mixing operation using GF multipliers incur only small increase in complexity and latency.

System Description

FIG. 1 is a block diagram that schematically illustrates a secure storage system 20, in accordance with an embodiment of the present invention. System 20 comprises a memory device 24 that stores data for a host 28 in a memory array 32. Memory device 24 may store any suitable type of data, such as, for example, user data, executable code, and secure system states. The system states include information such as, for example, the system up time, system events and errors logging information, and self-test results. The data may be stored in memory array 32 in encrypted or unencrypted form.

In the example of FIG. 1, memory device 24 comprises a nonvolatile memory (NVM). In alternative embodiments, memory device 24 may comprise any suitable memory of any suitable type, such as read only memory (ROM), random access memory (RAM), or any type of NVM, such as Flash memory. Host 28 communicates with memory device 24 over a link 34 using a respective communication interface (not shown).

The storage commands for memory device 24 include at least data read, write, modify and erase. The host executes storage operations by applying respective communication signals over link 34. Additionally or alternatively, a CPU 36 of host 28 may execute code that is fetched in real time from memory device 24 by reading code instructions and data over link 34.

In some embodiments, link 34 comprises a parallel link or bus, having separate data, address and control lines. In other embodiments, link 34 comprises a serial link, in which data, address and control information are transferred serially on a common physical connection. Examples of such serial interfaces include Serial Peripheral Interface (SPI), Inter-Integrated Circuit (I²C), Universal Serial Bus (USB), Multimedia Card (MMC) interface and Secure Digital (SD) interface.

In the present example, we assume that each of host 28 and memory device 24 comprises a separate semiconductor die, and that the two dies reside on a common package or on separate packages. We further assume that an unauthorized attacker has no direct access to secret information within each die, but can open the package to gain access to link 34 signals in attempt to break the system security. The main cryptographic attacks that an unauthorized user may attempt over link 34 include:

Modify transmitted information on the fly in an attempt to conduct a cryptographic attack at specific bit positions.

Obtain secret information that is stored in the memory device.

Modify information that is stored in the memory device.

Force the memory device to perform unauthorized commands.

Obtain knowledge regarding the system states.

Change the state of the system on the fly.

Perform reverse engineering to learn about the functionality of the system.

In the disclosed embodiments, the communication between host 28 and memory device 24 is secured by manipulating the data to be exposed over link 34 in a secret manner. The data manipulation comprises a cascade of cryptographic data mixing and stream ciphering, as will be described in detail below. As a result, even if an unauthorized attacker gains access to link 34 signals, it would be difficult or impossible for the attacker to conduct cryptographic attacks, e.g., as listed above. The data manipulation should have minimal performance penalty in terms of access delay to/from the memory device, and computational complexity. In some embodiments, the data manipulation includes data ciphering and cryptographic data mixing as described in detail below.

Each of memory device 24 and host 28 comprises a respective secret binding key 40 and 44. The host and the memory device use the binding keys to mutually authenticate each other, and to prevent unauthorized access to secret information when the authentication fails. The size of binding keys 40 and 44 should be large enough to provide sufficient cryptographic strength, such as 128-bit keys or larger. In some embodiments, host 28, memory device 24, or both, generate the binding keys using symmetric key sharing protocols, which result in identical binding keys 40 and 44. In other embodiments, the host and memory device employ asymmetric key sharing protocols (also referred to as public-private key sharing protocols), in which binding keys 40 and 44 are typically different.

In some embodiments, binding keys 40 and 44 are constant throughout the system lifetime. Alternatively, the configuration of keys 40 and 44 can be occasionally replaced by first erasing the binding keys, as well as any other secret information, from the host and memory device, and then reconfigure binding keys 40 and 44 to new secret values.

In some embodiments, host 28 generates binding key 40 locally, and delivers key 40 to be stored in a nonvolatile location of memory device 24. For example, in an embodiment, host 28 measures some physical property within the host die, and converts the measurement result to a respective bit sequence to be used as a secret value for binding key 40 (and/or other secret information). Such physical properties may comprise, for example, certain delay paths within the die, threshold voltage for flipping the states of semiconductor gates within the die, and self-oscillating frequency of a ring oscillator in the die.

In an embodiment, host 28, memory device 24, or both, verify the validity of binding key 40 (e.g., on power up) using a cryptographic digest calculated over binding key 40 and stored along with binding key 40 in the memory device. Host 28 and/or memory device 24 can similarly verify the validity of binding key 44 using a respective calculated cryptographic digest that is stored in the host along with binding key 44.

As described above, the data is securely exchanged over link 34, by manipulating the data to be exposed over link 34 in a secret manner. For the sake of clarity, FIG. 1 depicts only the reading direction, in which the host reads data that is stored in memory array 32. Data manipulation in the opposite direction, from host 28 to memory device 24, is typically implemented in a similar manner. The data stored in memory array 32 can be encrypted or non-encrypted.

Assume that memory device 24 stores data in memory array 32 in a given data unit, such as, for example 32-bit unit, or any other suitable data unit size. In the reading direction, memory device 24 retrieves a unit of plaintext data DX from memory array 32. DX inputs a mixing unit 48, which cryptographically maps the DX bits to produce mixed data MX. A stream cipher 52 then encrypts MX, and the memory device sends the encrypted data CX over link 34. In the description that follows the term "mixing" refer to cryptographic mapping of input bits to output bits using a secret mapping key, such that guessing the input bits from the output bits without knowing the mapping key is computationally infeasible. The mapping operation in mixing unit 48, and the ciphering operation in stream cipher 52 depend on secret session key 56 as described in detail below.

In the reading direction, host 28 receives the ciphered data CX and recovers the plaintext data DX. Host 28 first deciphers CX to recover MX using a stream decipher 60, and then inverts the operation of mixing unit 48 by de-mixing MX back to DX using de-mixing unit 64. The operations in decipher 60 and de-mixing unit 64 depend on a secret session key 68, which should be aligned to session key 56 to ensure proper inversion of the respective mixing and ciphering operations that were carried out by memory device 24.

In the writing direction (not shown in the figure), host 28 writes data to memory device 24. In this case, host 28 applies data mixing and ciphering prior to sending the data over link 34, while memory device 24 recovers the plaintext data by applying de-ciphering and then de-mixing.

For a given reading or writing direction, the end to end data flow includes de-mixing that inverts the mixing operation, and deciphering that inverts the ciphering operation. In some embodiments, however, the mixing and ciphering operations in the writing direction may be different from the mixing and ciphering operations in the reading direction.

Secret session keys 56 and 68 serve for manipulating the data to be exposed over link 34 in a secret manner. Host 28 can reconfigure session keys 56 and 68 occasionally, such as, for example, on power up. In some embodiments, the host sends to the memory device a session secret comprising an encrypted version of session key 56, which was encrypted using binding key 44. The memory device retrieves session key 56 by decrypting the session secret using binding key 40.

In other embodiments, host 28 sends an unencrypted session seed to the memory device. Each of memory device 24 and host 28 generates a respective session key 56 or 68 using both the session seed and the respective binding key 40 or 44 using any suitable cryptographic algorithms or methods such as, for example, SHA or AES.

Host 28 and memory device 24 further comprise respective cryptographic sequence generators 72 and 76. Stream cipher 52 applies bitwise XOR between the bit sequence generated by generator 72 and MX to generate the ciphered output CX. Similarly, stream decipher 60 applies bitwise XOR between the sequence generated by generator 76 and CX to recover MX.

Each of sequence generators 72 and 76 generates a pseudo-random sequence based on the respective session key 56 or 68, so that it would be infeasible for an unauthorized user who has no access to the session keys and to the state of the system to predict the actual pseudo-random sequences. Generators 72 and 76 are synchronized to generate a new sequence for each transaction over link 34, or once per several communication transactions.

Generators 72 and 76 can generate the pseudo-random sequence using any suitable method. In one embodiment, sequence generator 72 comprises a hash function, such as SHA-2, and a counter (not shown) that increments per transaction (or per several transactions). Generator 72 generates the output sequence by calculating the hash function over session key 56 and the counter value.

In another embodiment, generator 72 calculates the hash function over the session key, the counter value and the plaintext data (or part thereof) that was transmitted in a previous transaction, and is therefore known to both sides. In yet another embodiment, for example when the size of the hash function output is cryptographically insufficient, generator 72 further inputs the hash function result to a Linear Feedback Shift Register (LFSR) whose output serves as the pseudo-random sequence.

The configurations of system 20, memory device 24 and host 28 in FIG. 1 are example configurations, which are chosen purely for the sake of conceptual clarity. In alternative embodiments, any other suitable configuration of a secure storage system, memory device and host can also be used. For example, in one embodiment, the host communicates with the memory device via an additional memory controller. In this embodiment, each of the links between the host and memory controller, and between the memory controller and the memory device, can be secured using the disclosed techniques. In another embodiment, the host itself serves as a memory controller that manages the memory device.

The different elements of memory device 24 and host 28, such as mixing unit 48, stream cipher 52, sequence generator 72, decipher 60, de-mixing unit 64 and sequence generator 76 may be implemented using any suitable hardware, such as in an Application-Specific Integrated Circuit (ASIC) or Field-Programmable Gate Array (FPGA). In some embodiments, some elements of device 24 and host 28 can be implemented using software, or using a combination of hardware and software elements.

In some embodiments, certain elements of memory device 24 and/or host 28, such as mixing unit 48 and/or de-mixing unit 64, may comprise a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the example of FIG. 1, a host 28 communicates with a single memory device 24. In alternative embodiments, the host, such as a memory controller, may communicate with multiple memory devices, each having respective binding and session keys. In such embodiments, the host or memory controller should communicate with each memory device using matching respective secret keys.

In the example of FIG. 1 above, the sending side applies ciphering after data mixing and the receiving side applies de-ciphering and then de-mixing. In alternative embodiments, mixing may be applied after ciphering in the sending side, and de-ciphering after de-mixing in the receiving side.

In the description that follows and in the claims, the various elements of memory device 24 and/or host 28 are collectively referred to as logic circuitry.

Example Embodiments for Data Cryptographic Mixing

Figure 2:
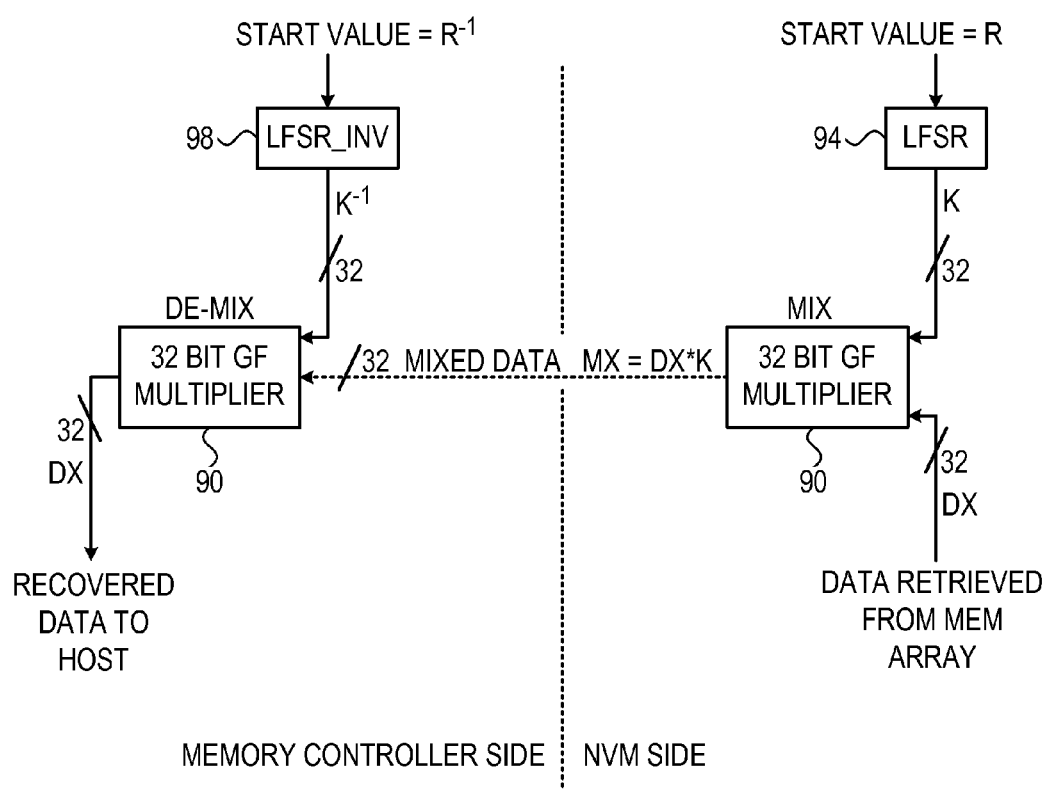
FIG. 2 is a diagram that schematically illustrates a method for cryptographic mixing, in accordance with an embodiment of the present invention.

FIG. 2 is a diagram that schematically illustrates a method for cryptographic mixing, in accordance with an embodiment of the present invention. Cryptographic mixing corresponds to a reversible mapping of input bits to output bits using a secret mixing key.

In the present example, the method includes cryptographic mixing and de-mixing parts that are carried out by respective mixing unit 48 and de-mixing unit 64. As depicted in FIG. 1 above, the output of mixing unit 48 is encrypted at the NVM side and decrypted in the host side, so that effectively the mixed data MX generated by mixing unit 48 is input to de-mixing unit 64. Therefore, although in practice the data flow typically includes data ciphering and deciphering, these elements are omitted for the sake of clarity, and the method of FIG. 2 is described with the output of mixing unit 48 directly inputs de-mixing unit 64.

In the example of FIG. 2, the mixing operation is based on Galois-Field (GF) multiplication. Mixing unit 48 comprises a 32-bit GF multiplier 90 and a LFSR 94. GF multiplier 90 accepts a 32-bit plaintext data DX and a 32-bit secret mapping key K from LFSR 94. GF multiplier 90 multiplies DX by K in the respective GF to produce the 32-bit output MX=DX*K.

Mixing unit 48 initializes LFSR 94 to an initial secret value denoted R. The initial value R is typically derived from the session key, and is therefore known to both the sending and receiving parties. Shifting LFSR 94 corresponds to multiplication by 2 in the respective GF field. For each new DX input (or per several such inputs), LFSR 94 shifts to produce a respective new mapping key K, thus achieving cryptographic mapping from DX to MX.

De-mixing unit 64 performs a cryptographic inverse mapping with respect to mixing unit 48. De-mixing unit 64 comprises 32-bit GF multiplier 90 (similar to the GF multiplier in the memory device side) and a LFSR 98 denoted LFSR_INV. When LFSR 94 initializes to R, LFSR_INV 98 initializes to the multiplicative inverse $R^{-1}$. In addition, shifting LFSR_INV is equivalent to multiplying by $2^{-1}$. As a result, by synchronizing between the shifting of LFSR 94 and LFSR_INV 98, the output of LFSR equals the multiplicative inverse of the output of LFSR 94 at all times. In other words, when LFSR 94 outputs a 32-bit secret K, LFSR_INV 98 outputs a respective 32-bit secret $K^{-1}$. By multiplying MX by $K^{-1}$, GF multiplier 90 recovers DX from MX.

In one embodiment, R may comprise any value, and host 28 calculates the multiplicative inverse $R^{-1}$ using any suitable method. In another embodiment, in which the computational resources for finding the multiplicative inverse are limited, R is restricted to the form $R=2^r$, r being a nonnegative integer. Similarly, the multiplicative inverse is restricted to the form $R^{-1}=(2^{-1})^r$, wherein the value $2^{-1}$ in the respective GF field can be determined in advance, e.g., at die design time. Calculating $R^{-1}$ using power operations is significantly less complex than calculating multiplicative inversion for a general number.

Figure 3:
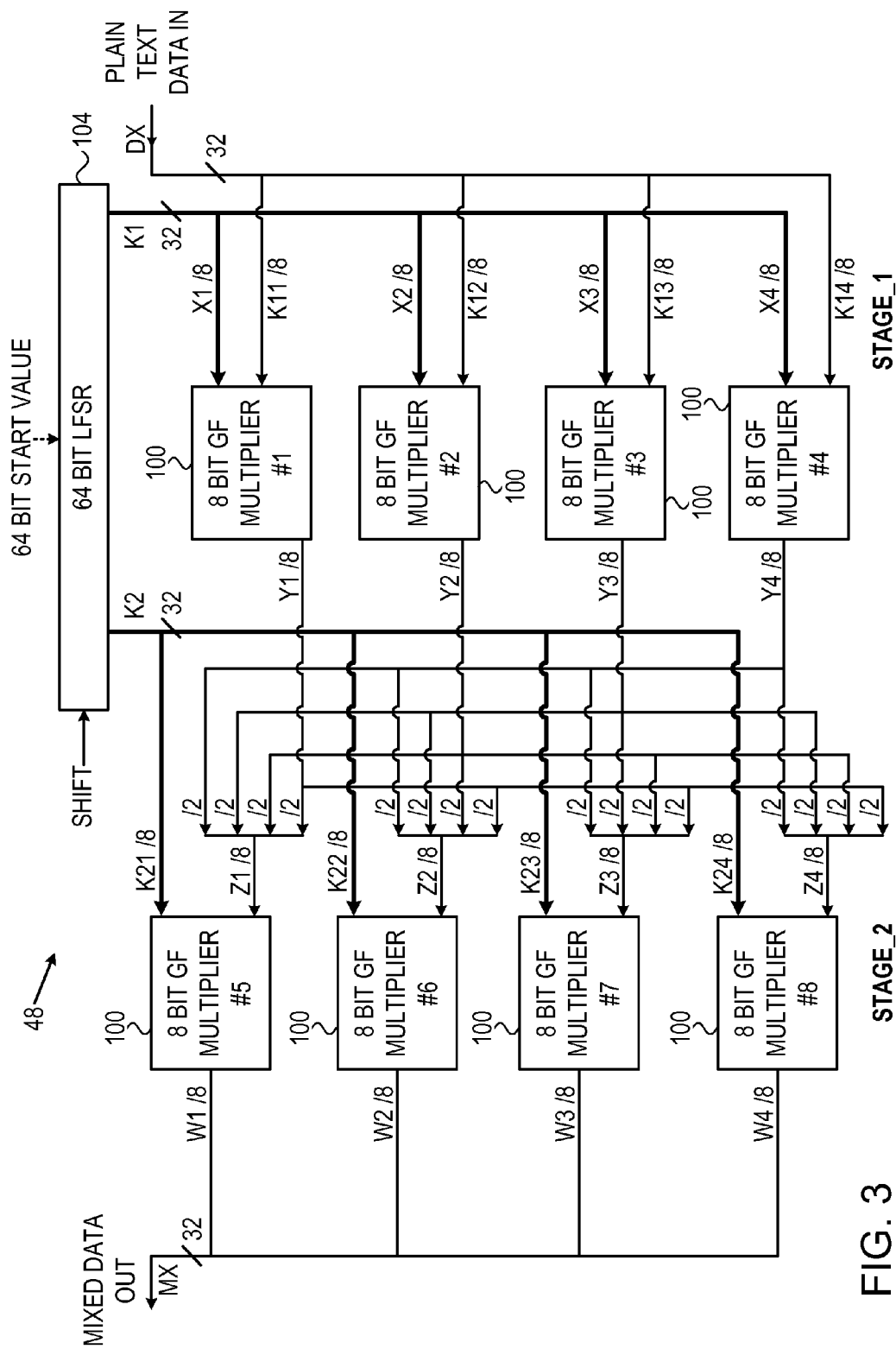
FIGS. 3 and 4 are diagrams that schematically illustrate alternative embodiments for cryptographic mixing, in accordance with an embodiment of the present invention.
Figure 4:
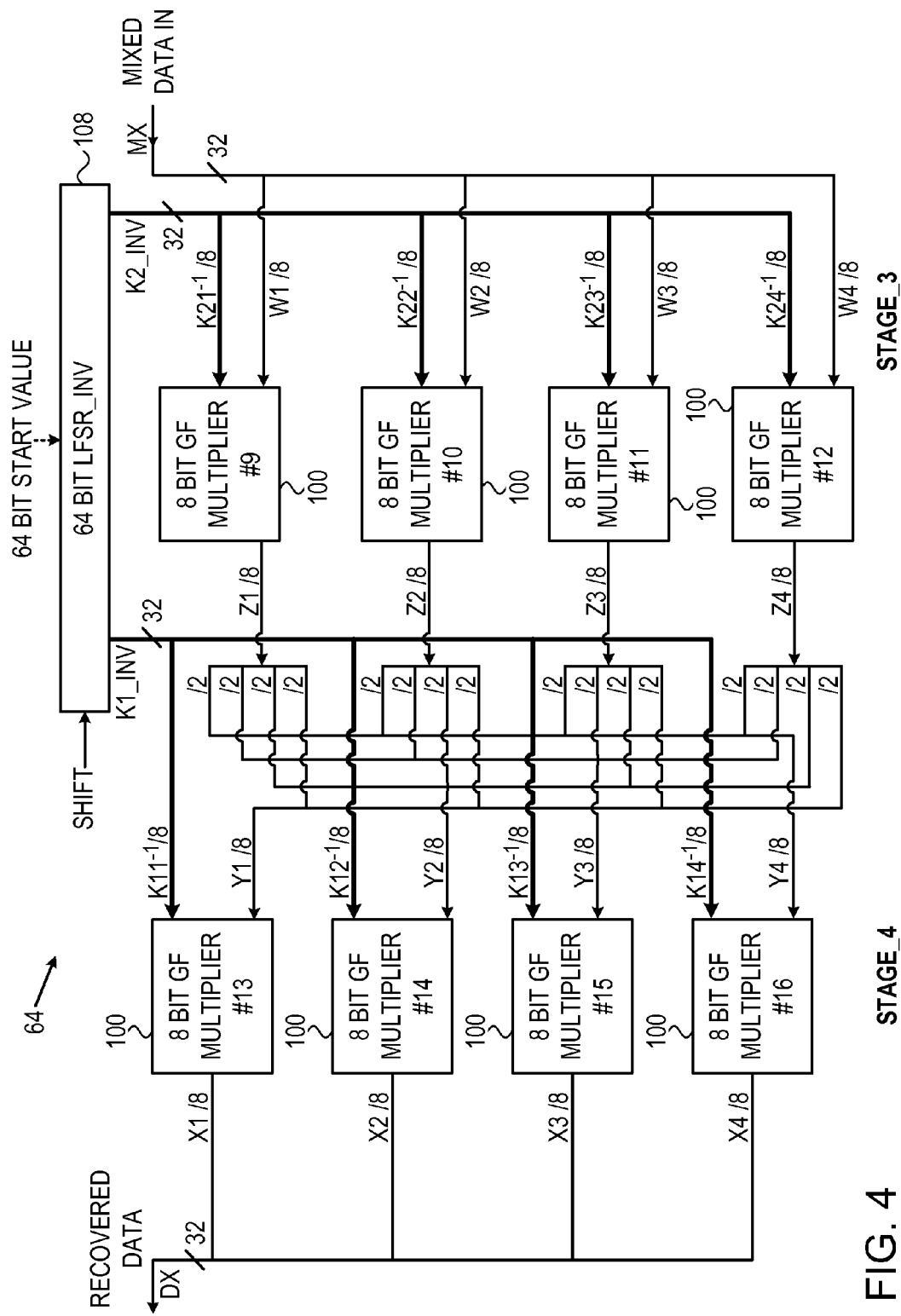

FIGS. 3 and 4 are diagrams that schematically illustrate alternative methods for cryptographic mixing, in accordance with an embodiment of the present invention. In the description that follows, we assume that mixing and de-mixing units 48 and 64 of FIG. 1 are implemented using the respective embodiments depicted in FIGS. 3 and 4, respectively.

In FIG. 3, the cryptographic mixing operation is implemented using two mixing stages denoted STAGE_1 and STAGE_2, each comprising four 8-bit GF multipliers 100. The GF multipliers of STAGE_1 and STAGE_2 are numbered #1 . . . #4 and #5 . . . #8, respectively. A 64-bit LFSR 104 generates two 32-bit secrets K1 and K2 to be used in the respective stages STAGE_1 and STAGE_2.

In STAGE_1, 32-bit input DX is split into four 8-bit sub-inputs denoted X1 . . . X4. Additionally, K1 is split into four 8-bit sub-keys denoted K11 . . . K14. GF multiplier #1 multiplies X1 by K11 and outputs the multiplication result Y1. Similarly, GF multipliers #2 . . . #4, respectively calculate Y2=X2*K12, Y3=X3*K13, and Y4=X4*K14.

In STAGE_2, K2 is split into four 8-bit sub-keys denoted K21 . . . K24 that are respectively input to GF multipliers #5 . . . #8. Each of the GF multipliers #5 . . . #8 accepts a respective second 8-bit input Z1 . . . Z4. An interconnection scheme maps Y1 . . . Y4 to Z1 . . . Z4.

In the present example, the interconnection scheme splits each of Y1 . . . Y4 into four 2-bit groups. Each of Z1 . . . Z4 is constructed by combining four 2-bit groups that each originates from a different Y1 . . . Y4 result. GF multipliers #5 . . . #8 respectively calculate 8-bit outputs W1=K21*Z1, W2=K22*Z2, W3=K23*Z3 and W4=K24*Z4, which are then combined into a 32-bit mixed data output MX.

FIG. 4 depicts an embodiment of de-mixing unit 64 that is compatible with the embodiment of mixing unit 48 depicted in FIG. 3 above. The embodiment depicted in FIG. 4 comprises two de-mixing stages STAGE_3 and STAGE_4, each comprising four 8-bit GF multipliers 100 that are numbered #9 . . . #12, and #13 . . . #16, respectively. STAGE_3 and STAGE_4 apply inverse mixing with respect to respective mixing operations of STAGE_2 and STAGE_1.

A 64-bit LFSR 108 (denoted LFSR_INV) outputs two 32-bit mapping keys denoted K1_INV and K2_INV. In STAGE_3, K2_INV is split into four sub-keys $K21^{-1}$ . . . $K24^{-1}$, which each equals the multiplicative inverse of K21 . . . K24, respectively. Similarly, in STAGE_4, K1_INV is split into four sub-secrets $K11^{-1}$ . . . $K14^{-1}$, which each equals the multiplicative inverse of K11 . . . K14, respectively.

LFSRs 104 and 108 are initialized to respective initial values, and then shifted in synchronization, so that the eight sub-keys used in STAGE_3 and STAGE_4 for de-mixing equal the multiplicative inverse of the respective eight sub-keys used for mixing in STAGE_2 and STAGE_1.

In an embodiment, both LFSRs 104 and 108 are initialized identically, and shifted in synchronization so that they both output identical 32-bit values. The 8-bit inverse keys in FIG. 4 are derived from respective 8-bit groups of LFSR 108 output, using lookup tables that convert GF elements to their GF multiplicative inverse.

In STAGE_3, 32-bit MX is split into the four 8-bit inputs W1 . . . W4. STAGE_3 recovers the intermediate results Z1 . . . Z4 by calculating Z1=W1*$K21^{-1}$ . . . Z4=W4*$K24^{-1}$. De-mixing unit 64 recovers Y1 . . . Y4 from Z1 . . . Z4 by applying an interconnection scheme between STAGE_3 and STAGE_4 that inverts the mapping from Y1 . . . Y4 to Z1 . . . Z4 used in mixing unit 48 of FIG. 3 above. STAGE_4 recovers X1 . . . X4 by calculating $X1=Y1*K11^{-1}$ . . . $X4=Y4*K14^{-1}$. 32-bit DX is then recovered by combining the four 8-bit X1 . . . X4 results.

In the disclosed techniques a host and a memory device communicate over a secured link. The presented techniques, however, are applicable to secure any other suitable communication link over which any other suitable parties communicate.

Although the embodiments described herein mainly address secure memory applications, the methods and systems described herein can also be used in other applications, such as in various other data transmission applications. For example, the disclosed techniques are applicable to secure any wired or wireless communication link, as well as for securing the interface of a file storage.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus comprising:
an interface, which is configured to communicate ciphered bits over a communication link; and
logic circuitry, which is configured to convert between a first stream of plaintext bits and a second stream of the ciphered bits that are exchanged over the communication link, by applying a cascade of a stream ciphering operation and a mixing operation that cryptographically maps input bits to output bits,
wherein the logic circuitry is configured to apply the mixing operation by multiplying the input bits by a respective non-constant mixing key in a Galois-Field (GF), and to iteratively update the mixing key in coordination with a remote apparatus at an opposite side of the communication link, by multiplying the mixing key in the respective GF by a constant element or by a GF multiplicative inverse of the constant element, such that at any given time the mixing key is the GF multiplicative inverse of a corresponding mixing key used by the remote apparatus.

2. The apparatus according to claim 1, wherein the ciphered bits are exchanged over the communication link between a memory device and a processor.

3. The apparatus according to claim 2, wherein the ciphered bits exchanged over the communication link comprise software code that executes in real time on the processor.

4. The apparatus according to claim 1, wherein the logic circuitry comprises two or more interconnected mixing stages, including at least first and last mixing stages, each mixing stage comprising multiple Galois Field (GF) multipliers, and wherein the logic circuitry is configured to apply the mixing operation by splitting the input bits among the GF multipliers of the first mixing stage, and combining results of the last mixing stage to produce the output bits.

5. The apparatus according to claim 4, wherein each of the GF multipliers in the one or more mixing stages is configured to accept multiplicand bits from the input bits or from a previous mixing stage, and to further accept a respective mixing key, wherein the mixing key is the GF multiplicative inverse of a corresponding mixing key in a remote apparatus at an opposite side of the communication link, and wherein the logic circuitry is configured to apply the mixing operation by multiplying the multiplicand bits by the respective mixing key in each of the multiple GF multipliers.

6. The apparatus according to claim 1, wherein the constant element and the GF multiplicative inverse equal 2 and $2^{-1}$ respectively, and wherein the logic circuitry is configured to generate the mixing key using a Linear Feedback Shift Register (LFSR) that implements a GF multiplication operation using a shifting operation.

7. The apparatus according to claim 1, wherein the logic circuitry is configured to initialize the mixing key to a number that is an integer power of 2 or $2^{-1}$ in the respective GF so that an initial mixing key is the GF multiplicative inverse of a corresponding initial mixing key used by the remote apparatus.

8. A method comprising:
exchanging ciphered bits over a communication link; and
converting between a first stream of plaintext bits and a second stream of the ciphered bits that are exchanged over the communication link, by applying a cascade of a stream ciphering operation and a mixing operation that cryptographically maps input bits to output bits,
wherein applying the mixing operation comprises multiplying the input bits by a respective non constant mixing key in a Galois-Field (GF), and iteratively updating the mixing key in coordination with a remote apparatus at an opposite side of the communication link, by multiplying the mixing key in the respective GF by a constant element or by a GF multiplicative inverse of the constant element, such that at any given time the mixing key is the GF multiplicative inverse of a corresponding mixing key used by the remote apparatus.

9. The method according to claim 8, wherein the communication link connects between a memory device and a processor.

10. The method according to claim 9, wherein exchanging the ciphered bits comprises exchanging software code that executes in real time on the processor.

11. The method according to claim 8, and comprising providing two or more interconnected mixing stages, including at least first and last mixing stages, each mixing stage comprising multiple Galois Field (GF) multipliers, wherein applying the mixing operation comprises splitting the input bits among the GF multipliers of the first mixing stage, and combining results of the last mixing stage to produce the output bits.

12. The method according to claim 11, wherein applying the mixing operation comprises providing to each of the GF multipliers in the one or more mixing stages multiplicand bits from the input bits or from a previous mixing stage, and a respective mixing key, wherein the mixing key is the GF multiplicative inverse of a corresponding mixing key in a remote apparatus at an opposite side of the communication link, and multiplying the multiplicand bits by the respective mixing key in each of the multiple GF multipliers.

13. The method according to claim 8, wherein the constant element and the GF multiplicative inverse equal 2 and $2^{-1}$ respectively, and wherein applying the mixing operation comprises generating the mixing key using a Linear Feedback Shift Register (LFSR) that implements a GF multiplication operation using a shifting operation.

14. The method according to claim 8, wherein updating the mixing key comprises initializing the mixing key to a number that is an integer power of 2 or $2^{-1}$ in the respective GF so that an initial mixing key is the GF multiplicative inverse of a corresponding initial mixing key used by the remote apparatus.

* * * * *